US012741208B2

(12) United States Patent
Escobedo et al.

(10) Patent No.: US 12,741,208 B2
(45) Date of Patent: Sep. 22, 2026

(54) VIDEO GAME STREAMING IN PARTS TO REDUCE LATENCY

(71) Applicant: AT&T Intellectual Property I, L.P., Atlanta, GA (US)

(72) Inventors: Adam Escobedo, Houston, TX (US); Sreya Nagumalla, Frisco, TX (US); Kedar Bhide, Madison, WI (US); Nirjhar Deb, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 664 days.

(21) Appl. No.: 18/148,428

(22) Filed: Dec. 29, 2022

(65) Prior Publication Data

US 2024/0216800 A1 Jul. 4, 2024

(51) Int. Cl.
*A63F 13/358* (2014.01)
*A63F 13/355* (2014.01)
*A63F 13/77* (2014.01)

(52) U.S. Cl.
CPC .......... *A63F 13/358* (2014.09); *A63F 13/355* (2014.09); *A63F 13/77* (2014.09); *A63F 2300/534* (2013.01); *A63F 2300/538* (2013.01); *A63F 2300/552* (2013.01)

(58) Field of Classification Search
CPC ...... A63F 13/358; A63F 13/355; A63F 13/77; A63F 2300/534; A63F 2300/538; A63F 2300/552
See application file for complete search history.

(56) References Cited

U.S. PATENT DOCUMENTS 11,123,634 B1 9/2021 Griffais
12,121,801 B2 * 10/2024 Fear ...................... A63F 13/493
2006/0080702 A1 * 4/2006 Diez ...................... A63F 13/12 725/31
2012/0283017 A1 * 11/2012 Ahiska .................. A63F 13/358 463/40
2014/0057722 A1 * 2/2014 Justice .................. A63F 13/358 463/43
2016/0045826 A1 * 2/2016 Speck ................... A63F 13/493 463/31
2020/0038764 A1 * 2/2020 Perlman ............. H04N 21/2385
2022/0040573 A1 * 2/2022 Fear ...................... A63F 13/493
2025/0041716 A1 * 2/2025 Fear ...................... A63F 13/358

* cited by examiner

*Primary Examiner* — Ankit B Doshi

(57) ABSTRACT

Methods, computer-readable media, and systems for streaming a video game in parts to reduce latency are disclosed. One example method includes executing a video game on a user endpoint device, determining that a game transition is detected in the video game, identifying, during the game transition, game content that is needed to continue executing the video game after the game transition, downloading, during the game transition, the game content that is needed to continue executing the video game after the game transition, identifying, during the game transition, game content that is currently downloaded to the user endpoint device that is not needed to continue executing the video game after the game transition, and deleting, from the user endpoint device during the game transition, the game content that is currently downloaded to the user endpoint device that is not needed to continue executing the video game after the game transition.

17 Claims, 3 Drawing Sheets

VIDEO GAME STREAMING IN PARTS TO REDUCE LATENCY

The present disclosure relates generally to streaming media, and relates more particularly to devices, non-transitory computer-readable media, and methods for streaming a video game in parts to reduce latency.

BACKGROUND

Streaming video games are video games that are stored and executed remotely on a provider's dedicated server(s) and streamed as video outputs directly to a player's device (e.g., a gaming console, a mobile phone, a tablet computer, a laptop computer, a desktop computer, or the like) via client software. The client software handles the player's inputs, which are sent back to the server(s) and executed in-game.

SUMMARY

The present disclosure broadly discloses methods, computer-readable media, and systems for streaming a video game in parts to reduce latency. In one example, a method performed by a processing system including at least one processor includes executing a video game on a user endpoint device, determining that a game transition is detected in the video game, identifying, during the game transition, game content that is needed to continue executing the video game after the game transition, downloading, during the game transition, the game content that is needed to continue executing the video game after the game transition, identifying, during the game transition, game content that is currently downloaded to the user endpoint device that is not needed to continue executing the video game after the game transition, and deleting, from the user endpoint device during the game transition, the game content that is currently downloaded to the user endpoint device that is not needed to continue executing the video game after the game transition.

In another example, a non-transitory computer-readable medium may store instructions which, when executed by a processing system including at least one processor, cause the processing system to perform operations. The operations may include executing a video game on a user endpoint device, determining that a game transition is detected in the video game, identifying, during the game transition, game content that is needed to continue executing the video game after the game transition, downloading, during the game transition, the game content that is needed to continue executing the video game after the game transition, identifying, during the game transition, game content that is currently downloaded to the user endpoint device that is not needed to continue executing the video game after the game transition, and deleting, from the user endpoint device during the game transition, the game content that is currently downloaded to the user endpoint device that is not needed to continue executing the video game after the game transition.

In another example, a device may include a processing system including at least one processor and a non-transitory computer-readable medium storing instructions which, when executed by the processing system, cause the processing system to perform operations. The operations may include executing a video game on a user endpoint device, determining that a game transition is detected in the video game, identifying, during the game transition, game content that is needed to continue executing the video game after the game transition, downloading, during the game transition, the game content that is needed to continue executing the video game after the game transition, identifying, during the game transition, game content that is currently downloaded to the user endpoint device that is not needed to continue executing the video game after the game transition, and deleting, from the user endpoint device during the game transition, the game content that is currently downloaded to the user endpoint device that is not needed to continue executing the video game after the game transition.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for streaming a video game in parts to reduce latency. As discussed above, streaming video games are video games that are stored and executed remotely on a provider's dedicated server(s) and streamed as video outputs directly to a player's device (e.g., a gaming console, a mobile phone, a tablet computer, a laptop computer, a desktop computer, or the like) via client software. The client software handles the player's inputs, which are sent back to the server(s) and executed in-game.

Although streaming is advantageous in the sense that it minimizes the need to purchase expensive computer hardware or to install games directly onto a player's device, the quality of the player experience is heavily dependent on the availability of reliable, high-speed Internet connections with low latency. Low latency is especially important, since the amount of delay between the player's inputs and when the player's inputs take effect in the game can affect gameplay, especially in fast-paced games that depend on precise inputs (e.g., competitive games, first-person shooters, fighting games, and the like).

Examples of the present disclosure provide a means for streaming a video game in parts to reduce latency. In one example, the computation engine for the streaming video game is hosted on the player's endpoint device (e.g., a gaming console, a mobile phone, a tablet computer, a laptop computer, a desktop computer, or the like) rather than on a remote server. This allows the player's endpoint device to process the player's inputs and the video game's outputs as quickly as possible, without packet loss or Internet-caused latency.

In further examples, the computation engine hosted on the player's endpoint device may determine, during game transitions, which game content (e.g., environments, characters, objects, sound effects, and/or other assets) needs to be downloaded for post-transition gameplay and which previously downloaded game content can be deleted (e.g., due to not being needed for post-transition gameplay). Thus, the computation can limit processing to the game content with which the player is actually interacting at a given time. Thus, the player's endpoint device does not need to download the entire game at once, but may only download parts of the game as those parts are needed (and delete those parts once they are no longer needed). This will reduce in-game latency between user inputs and game outputs without the constant need for fast or reliable Internet access. Although slow Internet speeds and/or unreliable connections may slow download speeds, once game content is downloaded, the game content will allow the game to be played with minimal latency since all further computation is being performed on the player's endpoint device. These and other aspects of the present disclosure are discussed in greater detail below in connection with the examples of FIGS. 1-3.

Figure 1:
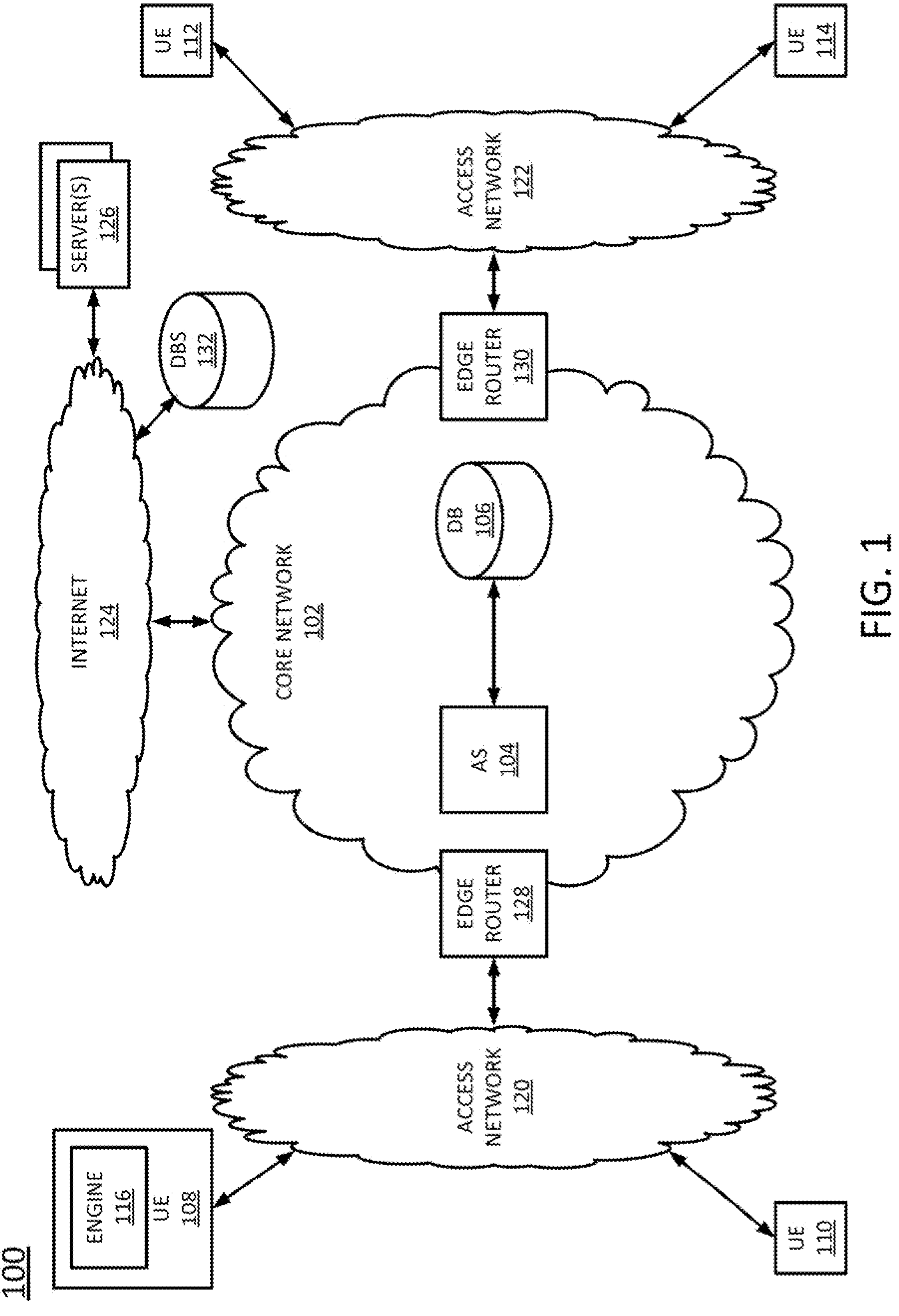
FIG. 1 illustrates an example system in which examples of the present disclosure for streaming a video game in parts to reduce latency may operate.

To further aid in understanding the present disclosure, FIG. 1 illustrates an example system 100 in which examples of the present disclosure for streaming a video game in parts to reduce latency may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices (UEs) 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a mobile device, a cellular smart phone, a gaming console, a gaming headset, a pair of gaming goggles, a set top box, a laptop computer, a tablet computer, a desktop computer, an application server, a bank or cluster of such devices, and the like. In one example, any one of the user endpoint devices 108, 110, 112, and 114 may be operable by a human user to stream a video game from the AS 104 (or from server(s) 126) in parts, as discussed in greater detail below.

In one example, any one or more of the UEs 108-114 may host a computation engine 116 (e.g., a processor and a set of executable instructions) that cooperates with the AS 104 (and/or with the server(s) 126) for streaming a video game in parts to reduce latency, in accordance with the present disclosure. The computation engine 116 may cause game content to be downloaded from the AS 104 and stored in a memory of the UEs 108-114. The computation engine 116 may further execute the streaming video game using the downloaded game content, including receiving and processing all user inputs and presenting all game outputs. The computation engine may determine what game content is needed for upcoming gameplay, and may download that game content, during game transitions (e.g., time in between levels, environments, or events where no active gameplay occurs). During this same time, the computation engine may also determine what game content that is already downloaded to the UEs 108-114 is no longer needed for upcoming gameplay, and may delete the unneeded game content from the memory of the UEs 108-114.

The AS 104 may cooperate with the computation engine 116 to provide game content for execution by the computation engine 116. For instance, the AS 104 may detect what part of the video game is about to be played (e.g., based on information provided by the computation engine 116) and may determine what game content is needed to execute the part of the video game about to be played. The AS 104 may store the needed game content locally, or may retrieve the needed game content from the DB 106 (or DB(s) 132). The AS 104 may cooperate with the computation engine 116 to facilitate download by the computation engine 116 of the needed game content.

In one example, one or more of the servers 126 and one or more of the databases (DBs) 132 may be accessible to user endpoint devices 108, 110, 112, and 114 and to the AS 104 via Internet 124 in general. The server(s) 126 and DBs 132 may operate in a manner similar to the AS 104 and DB 106, as described in further detail below.

Figure 3:
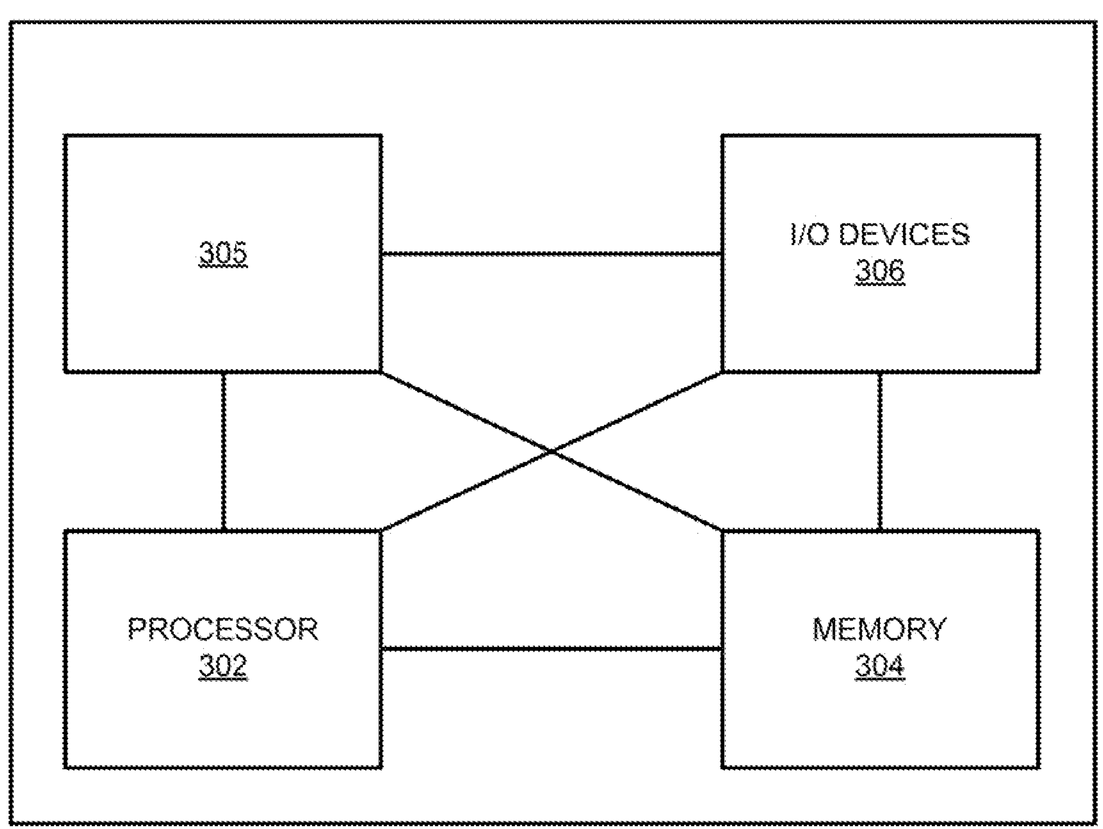
FIG. 3 illustrates an example of a computing device, or computing system, specifically programmed to perform the steps, functions, blocks, and/or operations described herein.

The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for streaming a video as described herein. One example method for streaming a video game in parts to reduce latency is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
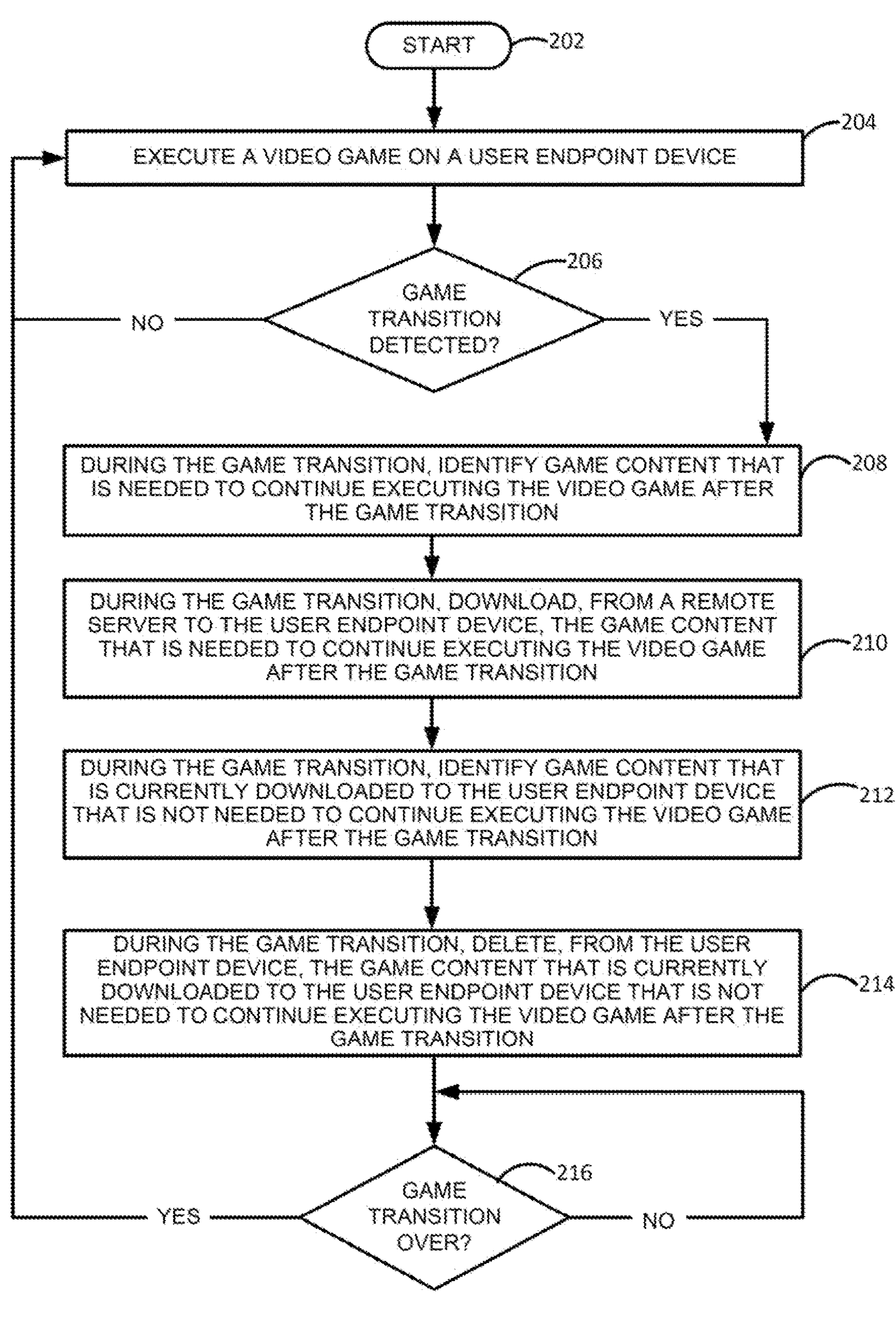
FIG. 2 illustrates a flowchart of an example method for streaming a video game in parts to reduce latency.

FIG. 2 illustrates a flowchart of an example method 200 for streaming a video game in parts to reduce latency, in accordance with the present disclosure. In one example, steps, functions and/or operations of the method 200 may be performed by a device as illustrated in FIG. 1, e.g., a user endpoint device 108 including a computation engine 116 or any one or more components thereof. In another example, the steps, functions, or operations of method 200 may be performed by a computing device or system 300, and/or a processing system 302 as described in connection with FIG. 3 below. For instance, the computing device 300 may represent at least a portion of user endpoint device 108 and/or a computation engine 116 in accordance with the present disclosure. For illustrative purposes, the method 200 is described in greater detail below in connection with an example performed by a processing system, such as processing system 302.

The method 200 begins in step 202 and proceeds to step 204. In step 204, the processing system may execute a video game on a user endpoint device.

In one example, the video game comprises a streaming video game, i.e., a video game that is primarily stored and executed remotely on a provider's dedicated server(s) and streamed as video outputs directly to the user endpoint device via client software. In the instant case, however, the user endpoint device itself stores and executes portions of the video game locally.

For instance, the processing system may be part of a computation engine that is installed on the user endpoint device. The computation engine may download portions of the game content associated with the video game to a local memory of the user endpoint device. The computation engine may then perform the computations that would normally be performed by the dedicated server(s), i.e., receiving and processing user inputs and presenting responsive game outputs. However, because the computations are being performed locally by the computation engine, the latency between the player providing user inputs and the user endpoint device rendering the responsive outputs is greatly reduced.

In step 206, the processing system may determine whether a game transition is detected in the video game. In one example, a game transition may comprise a time during which the video game is transitioning from one level, environment, event or the like to another level, environment, event, or the like. In other words, a game transition comprises a time during which no active gameplay occurs (e.g., user inputs are disabled or not processed, and the only output that may be presented to the player is a loading screen or similar content).

As discussed in further detail below, examples of the present disclosure make use of game transitions to download new game content (e.g., game content that is needed to continue executing the video game after the game transition) and to delete unneeded game content (e.g., game content that may have been needed to execute the video game prior to the game transition, but that is no longer needed to continue executing the video game after the game transition). Thus, examples of the present disclosure offload the latency associated with transferring data from the dedicated server(s) to the user endpoint device to a time when the player is less likely to notice the delay and that is less disruptive to the player's gaming experience (e.g., when no active gameplay is occurring, as opposed to after every user input event during active gameplay as is typical).

If the processing system concludes in step 206 that a game transition is not detected, then the method 200 may return to step 204, and the processing system may continue to execute the video game on the user endpoint device (i.e., by performing computations locally on the user endpoint device).

If, however, the processing system concludes in step 206 that a game transition is detected, then the method 200 may proceed to step 208.

In step 208, the processing system may, during the game transition, identify game content that is needed to continue executing the video game after the game transition. As discussed above, game content may include environments, characters, objects, sound effects, and/or other assets that are needed to render the video game on the user endpoint device. As also discussed above, the user endpoint device may, at any given time, store portions of the game content, rather than the entirety of the game content. Which portions of the game content are stored on the user endpoint device at any given time may depend on the portion of the video game that the player is currently playing.

For instance, game content that is required to execute one level or stage of the video game may be different from the game content that is required to execute another level or stage of the video game (e.g., different characters, environments, objects, sound effects, or the like may be needed). Since the game transition may mark a transition of the gameplay from one level or stage to a next level or stage, the game content that is needed to execute the video game after the transition may be different from the game content that is needed to execute the video game before the transition.

In one example, the game content that is needed to continue executing the video game after the game transition may be identified during the game transition (e.g., during a time at which user inputs are disabled or active gameplay is otherwise paused). In a further example, the game content that is identified in step 208 comprises only game content that is needed to execute the game during a time between the game transition and a subsequent game transition (e.g., as opposed to between the game transition and the end of the video game). Thus, for instance, the processing system may identify in step 208 only the game content that is needed to execute the next level or stage of the video game.

In one example, the dedicated server(s) may assist the processing system in identifying the game content that is needed to continue executing the video game after the game transition. For instance, upon initially launching the video game, the dedicated server(s) may provide the processing system with a manifest or similar file that identifies the game content that is needed to execute each level or stage of the video game (or each portion of the video game that occurs between a pair of successive game transitions). Thus, the processing system may consult the manifest during the game transition in order to determine what content may need to be downloaded to execute the video game after the game transition. In another example, the dedicated server may provide the processing system, during the game transition, with a list of game content (and, optionally storage locations for the game content) that is needed to execute the next level or stage of the video game.

In step 210, the processing system may, during the game transition, download the game content that is needed to continue executing the video game after the game transition. For instance, the processing system may download, from the dedicated server(s), any characters, environments, objects, sound effects, or the like that may be needed to continue executing the video game after the game transition (or to continue executing the video game during the time between the game transition and a subsequent game transition). Any game content that is downloaded in step 210 may be stored locally in a memory of the user endpoint device.

It is noted that in some cases, some of the game content that is needed to continue executing the video game after the game transition may already reside in the local memory of the user endpoint device due to a previous download. In this case, the game content that is downloaded in step 210 may comprise less than all of the game content that is actually needed to continue executing the video game after the game transition (e.g., any game content needed to continue executing the video game after the game transition that has already been downloaded does not need to be re-downloaded).

In step 212, the processing system may, during the game transition, identify game content that is currently downloaded to the user endpoint device that is not needed to continue executing the video game after the game transition. As discussed above, game content that is required to execute one level or stage of the video game may be different from the game content that is required to execute another level or stage of the video game (e.g., different characters, environments, objects, sound effects, or the like may be needed). Since the game transition may mark a transition of the gameplay from one level or stage to a next level or stage, the game content that is needed to execute the video game after the transition may be different from the game content that is needed to execute the video game before the transition.

Thus, some of the game content that was used to execute a level or stage of the video game that preceded the game transition may no longer be needed to execute a level or stage of the video game that takes place after the game transition. In one example, the dedicated server(s) may assist the processing system in identifying the game content that is not needed to continue executing the video game after the game transition. For instance, as discussed above, upon initially launching the video game, the dedicated server(s) may provide the processing system with a manifest or similar file that identifies the game content that is needed to execute each level or stage of the video game (or each portion of the video game that occurs between a pair of successive game transitions). Thus, the processing system may consult the manifest during the game transition in order to determine what currently downloaded content may no longer be needed. In another example, the dedicated server may provide the processing system, during the game transition, with a list of game content (and, optionally storage locations for the game content) that is needed to execute the next level or stage of the video game; and currently downloaded content that is not on the list may be identified by the processing system as being not needed to execute the video game after the game transition.

In step 214, the processing system may, during the game transition, delete, from the user endpoint device, the game content that is currently downloaded to the user endpoint device that is not needed to continue executing the video game after the game transition. For instance, the processing system may evict, from a local memory of the user endpoint device, any currently downloaded game content that is identified in step 212 as being not needed to continue executing the video game after the game transition. This conserves space in the local memory of the user endpoint device and ensures that there is space to store any newly downloaded game content that may be needed to execute the video game after the game transition.

In step 216, the processing system may determine whether the game transition is over. As discussed above, the game transition may comprise a time in between levels, environments, or events where no active gameplay occurs in the video game. For instance, user inputs may be disabled or simply not processed during game transitions. Once the game transition ends, active gameplay (e.g., including processing of user inputs and presentation of responsive game outputs) may be resumed.

If the processing system concludes in step 216 that the game transition is over, then the method 200 may return to step 204, and the processing system may continue to execute the video game on the user endpoint device using the newly downloaded game content that was downloaded in step 210 (and, optionally, any game content that was previously downloaded to the user endpoint device that is still needed to continue executing the video game after the game transition).

For instance, the processing system may execute the next level or stage of the video game that occurs after the game transition, using the newly downloaded game content to process user inputs and present game outputs that are responsive to user inputs.

If, however, the processing system concludes in step 216 that the game transition is not over, then the method 200 may repeat step 216 until the processing system concludes that the game transition is over and the method 200 can return to step 204.

One or more of steps 204-216 may be repeated, as described above, as the player continues to play the video game on the user endpoint device. However, if the player should exit out of the video game, then the method 200 may terminate (at which time, any game content that is currently downloaded to the user endpoint device may be saved in the memory of the user endpoint device to allow the player to resume the video game from the point at which the video game was exited).

Thus, examples of the present disclosure provide a means for streaming a video game in parts to reduce latency. By hosting the computation engine for the streaming video game on the player's endpoint device rather than on a remote server, the player's inputs can be processed and the video game's outputs can be rendered as quickly as possible, without packet loss or Internet-caused latency in between.

Moreover, by only downloading game content as the game content is needed (as opposed to downloading all game content at once) and by deleting downloaded game content once the downloaded game content is no longer needed, in-game latency between user inputs and game outputs can be further minimized without the constant need for fast or reliable Internet access. Although slow Internet speeds and/or unreliable connections may slow download speeds, once game content is downloaded, the game content will allow the game to be played with minimal latency since all further computation is being performed on the player's endpoint device. By timing the download of new game content and the deletion of old game content to occur during game transitions, the latency associated with transferring data from the dedicated server(s) to the user endpoint device can be offloaded to a time when the player is less likely to notice the delay and that is less disruptive to the player's gaming experience (e.g., when no active gameplay is occurring, as opposed to after every user input event during active gameplay as is typical).

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for streaming a video game in parts to reduce latency, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for streaming a video game in parts to reduce latency (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for streaming a video game in parts to reduce latency (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

executing, by a processing system including at least one processor, a video game on a user endpoint device, wherein the executing comprises presenting a plurality of assets of game content via the user endpoint device;

determining, by the processing system, that a game transition is detected in the video game;

identifying, by the processing system during the game transition, at least one asset of the plurality of assets that is needed to continue executing the video game after the game transition;

downloading, by the processing system during the game transition, the at least one asset that is needed to continue executing the video game after the game transition;

identifying, by the processing system during the game transition, another asset of the plurality of assets of game content that is currently downloaded to the user endpoint device that is not needed to continue executing the video game after the game transition; and deleting, from the user endpoint device by the processing system during the game transition, the another asset that is currently downloaded to the user endpoint device that is not needed to continue executing the video game after the game transition.

2. The method of claim 1, wherein the video game comprises a streaming video game.

3. The method of claim 1, wherein the processing system is part of a computation engine that is installed on the user endpoint device.

4. The method of claim 1, wherein the executing comprises receiving and processing user inputs from the user endpoint device and presenting responsive game outputs on the user endpoint device.

5. The method of claim 1, wherein the game transition comprises a time in the video game during which no active gameplay occurs.

6. The method of claim 5, wherein the game transition comprises a time during which the video game is transitioning from one level, environment, or event to another level, environment, or event.

7. The method of claim 5, wherein user inputs to the video game are disabled during the game transition.

8. The method of claim 1, wherein the at least one asset that is needed to continue executing the video game after the game transition comprises at least one of: an environment, a character, an object, or a sound effect needed to render the video game on the user endpoint device.

9. The method of claim 1, wherein the at least one asset that is needed to continue executing the video game is downloaded from a remote server that supports the video game.

10. The method of claim 9, wherein the identifying the at least one asset that is needed to continue executing the video game after the game transition comprises consulting a list provided by the remote server during the game transition, and wherein the list identifies the at least one asset that is needed to continue executing the video game after the game transition.

11. The method of claim 1, further comprising:

continuing, by the processing system once the game transition has ended, to execute the video game on the user endpoint device using the at least one asset that is downloaded.

12. The method of claim 11, further comprising:

repeating, by the processing system, the identifying the at least one asset that is needed, the downloading the at least one asset that is needed, the identifying the another asset that is not needed, and the deleting the another asset that is not needed when a subsequent game transition is detected.

13. The method of claim 1, wherein at any time, assets of the plurality of assets that are stored in a local memory of the user endpoint device comprise less than an entirety of the plurality of assets.

14. A non-transitory computer-readable medium storing instructions which, when executed by a processing system including at least one processor, cause the processing system to perform operations, the operations comprising:

executing a video game on a user endpoint device, wherein the executing comprises presenting a plurality of assets of game content via the user endpoint device;

determining that a game transition is detected in the video game;

identifying, during the game transition, at least one asset of the plurality of assets that is needed to continue executing the video game after the game transition;

downloading, during the game transition, the at least one asset that is needed to continue executing the video game after the game transition;

identifying, during the game transition, another asset of the plurality of assets of game content that is currently downloaded to the user endpoint device that is not needed to continue executing the video game after the game transition; and deleting, from the user endpoint device during the game transition, the another asset that is currently downloaded to the user endpoint device that is not needed to continue executing the video game after the game transition.

15. The non-transitory computer-readable medium of claim 14, wherein the video game comprises a streaming video game.

16. The non-transitory computer-readable medium of claim 14, wherein the processing system is part of a computation engine that is installed on the user endpoint device.

17. A device comprising:

a processing system including at least one processor; and a non-transitory computer-readable medium storing instructions which, when executed by the processing system, cause the processing system to perform operations, the operations comprising:

executing a video game on a user endpoint device, wherein the executing comprises presenting a plurality of assets of game content via the user endpoint device;

determining that a game transition is detected in the video game;

identifying, during the game transition, at least one asset of the plurality of assets that is needed to continue executing the video game after the game transition;

downloading, during the game transition, the at least one asset that is needed to continue executing the video game after the game transition;

identifying, during the game transition, another asset of the plurality of assets of game content that is currently downloaded to the user endpoint device that is not needed to continue executing the video game after the game transition; and deleting, from the user endpoint device during the game transition, the another asset that is currently downloaded to the user endpoint device that is not needed to continue executing the video game after the game transition.

* * * * *